United States Patent [19]

Pederson et al.

[11] Patent Number: 5,753,291
[45] Date of Patent: May 19, 1998

[54] PROCESS FOR PREPARING PARFRIED AND FROZEN POTATO STRIPS

[75] Inventors: Paul Pederson, Richland; David Braich, Kennewick; Roger Samoray; Jerry L. Sloan, both of Richland, all of Wash.

[73] Assignee: Lamb-Weston, Inc., Richland, Wash.

[21] Appl. No.: 695,765

[22] Filed: Jul. 22, 1996

[51] Int. Cl.$^6$ ...................................................... A23L 1/217
[52] U.S. Cl. ........................ 426/441; 426/510; 426/511; 426/637
[58] Field of Search ........................ 426/637, 438, 426/441, 509, 510, 511

[56] References Cited

U.S. PATENT DOCUMENTS

| | | | |
|---|---|---|---|
| 3,397,993 | 8/1968 | Strong | 426/441 |
| 3,649,305 | 3/1972 | Wilder | 426/441 X |
| 3,934,046 | 1/1976 | Weaver et al. | 426/418 |
| 4,254,153 | 3/1981 | Ross et al. | 426/441 |
| 4,297,377 | 10/1981 | Harney et al. | 426/438 |
| 4,447,459 | 5/1984 | Balboni et al. | 426/441 |
| 4,542,030 | 9/1985 | Haury et al. | 426/262 |
| 4,579,743 | 4/1986 | Hullah | 426/262 |
| 4,590,080 | 5/1986 | Pinegar | 426/441 |
| 4,632,838 | 12/1986 | Doenges | 426/441 |
| 4,751,093 | 6/1988 | Hong et al. | 426/438 |
| 4,761,294 | 8/1988 | Hamann et al. | 426/438 |
| 4,900,576 | 2/1990 | Bonnett et al. | 426/438 |
| 5,084,291 | 1/1992 | Burrows et al. | 426/441 |
| 5,302,410 | 4/1994 | Calder et al. | 426/637 |
| 5,324,534 | 6/1994 | Stevens et al. | 426/637 |
| 5,328,704 | 7/1994 | Ritch | 426/441 X |

*Primary Examiner*—Arthur L. Corbin
*Attorney, Agent, or Firm*—Klarquist Sparkman Campbell Leigh & Whinston, LLP

[57] ABSTRACT

Whole potatoes are optionally peeled and optionally preheated before cutting into strips. The strips are blanched in water before being dipped in an aqueous solution containing sodium chloride, dextrose and chelating agents. The strips are then blanched in steam before being dried in heated air. The partially dried strips are again treated with steam for a short time to blanch the strips, then parfried in oil, cooled for an extended period, and parfried a second time in oil. The strips are then frozen and packaged, ready for reconstitution by frying, oven or microwave rethermalization.

12 Claims, No Drawings

PROCESS FOR PREPARING PARFRIED AND FROZEN POTATO STRIPS

The present invention relates generally to food processing, and more particularly to a process for preparing parfried and frozen french fried potatoes and the like.

BACKGROUND OF THE INVENTION

Parfried and frozen potato products are widely available and used in both the food service markets and consumer markets. Because the worldwide demand for these products in the food service industry alone is so large and growing each year, parfried and frozen potatoes have become very important products to the food processing industry generally, and to the potato processing industry in particular. Indeed, entire industries and markets have developed around these products alone. As such there is a constant demand not only for new products, but also for improved processing methods to make the products.

The most common of the many different parfried frozen potato products now available is the ubiquitous french-fried potato strip that is commonly called the "french fry." But there are many different parfried frozen products as well. For instance, in addition to traditional french fries, parfried and frozen potato products are available in a wide variety of different cut shapes and forms, such as helical fries and waffle-cut fries. There are also various flavored products and the like.

Within the food service industry, and particularly in the fast food segment, most french fries are prepared at the restaurant by "finish frying" the frozen potato strips in hot oil. The quality of the finished french fries that are sold to consumers is effected not only by the finish frying at the restaurant, but also is greatly effected by the processing methods used to make the frozen strips. There are many well known potato processing methods, and in particular, many methods for producing french fries. Common to most known processes is the desire to produce a product that meets consumer's desires. Attributes that are commonly desirable in french-fried products, and particularly in french fries, include a tender but crispy exterior surface, and a soft, mealy interior that is moist yet neither too soggy nor too dry. Other desirable attributes include a long holding time, which refers to the time that the ready-to-consume product may be held after the finish frying step. A long holding time is of particular benefit in the food service industry so that "reconstituted" product may be held for a reasonable period of time before it must be discarded. However, as the holding time increases, in most instances the crispy texture of the french fry decreases. That is, the french fry tends to get soggy the longer it is held.

These desirable attributes are most readily obtained when the frozen parfried strips are prepared by reconstituting the frozen strips by finish frying in hot oil. This is the process typically used in the food service industry, and especially by fast food restaurants, where the finish frying is typically done at the restaurant. Finish frying typically involves immersing the frozen potato strips for about 2¼ to 2¾ minutes, sometimes longer, in hot oil. French fries resulting from this kind of finish frying typically have a solids content of between about 55 to 60% by weight, and provide the best flavor and texture. Nonetheless, frozen parfried potato products may also be reconstituted in conventional ovens or convection ovens, or by microwave reconstitution.

Two well known processes used in preparing french fries that are suitable for reconstitution by finish frying are disclosed in U.S. Pat. No. 3,397,933 to Strong and U.S. Pat. No. 3,649,305 to Wilder.

The Strong patent discloses a process in which raw potato strips are blanched until they become translucent throughout, dried in hot air at a temperature within the range of 150° F. to 350° F. for 5 to 20 minutes to cause a weight loss of at least 20%, parfried in oil at a temperature within the range of 300° F. to 375° F. for 15 to 60 seconds, and then frozen. The Strong patent indicates that the frozen strips may be reconstituted by frying them in oil at a temperature within the range of 300° F. to 375° F. for 1½ to 3½ minutes, although in each of the four examples provided, the frozen strips are finish fried for at least 2½ minutes.

The Wilder patent discloses a process in which raw potato strips are dried in circulating air at a temperature within the range of 150° F. to 350° F. to cause a weight loss of 10% to 30%, blanched, parfried, cooled and then frozen. The patent indicates that the frozen strips may be reconstituted by frying them in oil at a temperature of about 325° F. to 375° F. for about 1½ to 3 minutes, although the preferred frying time is indicated to be 2¼ minutes. No specific examples are provided.

While the methods disclosed in these two patents produce french fries that are typical of the fried products used in the fast food industry, other methods of reconstitution are also desirable. For instance, oven reconstitution (either in a conventional oven or a convection oven) and microwave reconstitution either in a restaurant or at home are market segments that food processors have also addressed. These methods of reconstitution have an advantage of being more readily available to home consumers, but are also often used in the food service industry. Another advantage of reconstitution in a conventional oven or a microwave oven is the benefit of reduced fat content when compared to products that are reconstituted by deep fat frying. Lower fat content is sought by many consumers, particularly those interested in monitoring and controlling their consumption of fats.

To provide high quality products that have the desirable attributes noted above for reconstitution in conventional or microwave ovens, processors have adapted various techniques for the preparation of the frozen strips. For example, U.S. Pat. No. 4,109,020 to Gorfien et al. discloses a combination of parfrying and drying steps that reduce the moisture content of the strips, thereby reducing the tendency of the microwave-reconstituted strips to be limp and soggy. Another example of a product designed for microwave reconstitution is disclosed in U.S. Pat. No. 4,219,575 to Saunders et al., which discloses a strip surface configuration that is sinusoidal (i.e., "crinkle cut"). The crinkle cut strips are subjected to an extended parfrying step to increase crispiness when reconstituted in a microwave oven. Other examples of processing methods directed toward microwave reconstitution are disclosed, for instance, by U.S. Pat. No. 4,590,080 to Pinegar and U.S. Pat. No. 4,900,576 to Bonnett et al.

In view of the evolving demand for parfried frozen products, particularly french fries, and regardless of the particular market in which the products will be used and the manner in which the products will be reconstituted, food processors are continually developing new products and processing methods to produce parfried frozen products that have consistently high quality and a high degree of consumer acceptance.

While each of the prior art processes for preparing french fries builds to some extent on the processes that came before them, there always exists a need for improved processes for producing parfried and frozen potato products that exhibit desirable attributes of quality, texture and flavor, and also of holding time, regardless of the manner of reconstitution. It is therefore one object of the present invention to provide a process for preparing parfried and frozen potato products that exhibit desirable attributes regardless of the manner of reconstitution.

A further object of this invention is to provide a processing method for preparing parfried and frozen potato products which, upon reconstitution, exhibit desirable characteristics of flavor attributes, texture and appearance.

Another object of this invention is to provide a processing method that produces a finished product that exhibits desirable product attributes for an extended holding time after reconstitution, and which has a superior tender but crisp texture even on extended holding after reconstitution.

Still another object of this invention is to provide a frozen parfried french fry that, when reconstituted in either an oven or by microwave, exhibits desirable characteristics yet has a lower fat content than comparable product that is reconstituted by deep fat frying.

Other objects and advantages of the invention will become apparent from the following detailed description of the invention.

SUMMARY OF THE INVENTION

In accordance with the foregoing principles and objects, the present invention comprises an improved process for preparing french fried potato strips and the like. The frozen french fries prepared according to the process of this invention may be reconstituted by frying in hot oil, by heating in a conventional or a convection oven, or by microwave heating, with the finished product exhibiting desirable attributes including flavor, texture, appearance and other quality attributes regardless of the manner in which the product is reconstituted.

According to the process of this present invention, whole potatoes, which have been graded, washed, sorted and optionally peeled, are optionally preheated before being cut into strips. The cut strips are blanched a first time by immersing the strips in hot water. Next, the strips are immersed in a warm aqueous solution containing for instance, among other optional ingredients, sodium chloride, dextrose, sodium acid pyrophosphate, flavors, starches, spices and/or other seasonings. The strips are then blanched a second time, this time in steam, then partially dried in warm air to reduce the moisture content of the strips. The strips are then exposed to steam and thereafter held in ambient air. The strips are then parfried a first time, cooled, parfried a second time, and then frozen.

It has been found that this combination of processing steps produces an exceptional finished product that is superior to product produced according to other known methods.

DETAILED DESCRIPTION OF A PREFERRED EMBODIMENT

In accordance with the present invention, raw potatoes, generally and preferably of the Russet-Burbank variety, are cleaned, peeled, trimmed and inspected for defects. The washing and peeling steps are performed according to well known conventional processes. Thus, typically the potatoes are cleaned using a water flume or spray, or combinations of both. And the raw potatoes may be peeled with the aid of steam as, for example, by subjecting the potatoes to steam at about 200 lbs/in$^2$ for a time of about 13 seconds.

While the preferred embodiment disclosed herein includes the step of peeling the potatoes, that step may be eliminated from the process if an unpeeled product is desired.

After washing and sorting, the whole, peeled potatoes are optionally preheated, preferably in hot water that is maintained at between about 125° F. and 145° F. for about 30 minutes. Preheating in water can be accomplished in any number of known manners, but is preferably done by conveying the potatoes through either a heated water bath, or by spraying the potatoes with heated water as the potatoes are conveyed past the sprayers. The time period for preheating may be somewhat longer or shorter than the preferred retention time of about 30 minutes at the preferred water temperature of about 135° F. During the preheating step, if this step is used, the majority of the potato tissue is heated uniformly to approximately the temperature of the water.

An alternative manner of preheating the potatoes in this step is to preheat the potatoes in warm air. If the preheating is done in air, it can be carried out in any number of conventional manners, and preferably is done in a heating tunnel as the potatoes are conveyed through the tunnel. Preheating in this manner in air would typically involve holding the potatoes in air heated to about 135° F. for about 30 minutes, with countercurrent air flow. As with preheating in water, the potatoes are heated thoroughly throughout.

After the preheating step, the pre-heated potatoes are then cut into sections suitably sized for french fried potato strips. The cutting itself is done according to well known methods. A suitable size cut would have a cross-sectional dimension of about between 0.18 inches by 0.18 inches to 0.75 inches to 0.75 inches, with a preferred cross-sectional dimension of about between 0.25 inches by 0.25 inches to 0.50 inches by 0.50 inches, although other cut sizes of strips are equally applicable to this process. The process detailed herein is also equally applicable to other cuts in addition to potato strips, for instance, helical strips, spiral strips, "crinkle cut" strips, "concertina cut" strips, waffle cuts and many other shapes. Thus, as used herein the term "strips" refers to any of these and other cut shapes to which the process may apply.

The potato strips are then blanched a first time by immersing the strips in hot water. For this initial blanch, the strips are immersed in water held at between about 150° F. to 200° F. for a time period of about between 4 to 20 minutes. Preferably, the strips are immersed at this point in 160° F. water for about 6 minutes.

The potato strips are then dipped in a flume or sprayed with a hot aqueous solution held at about 150° F. to 170° F. for about 30 seconds. The aqueous solution contains preferably about 2.2% sodium chloride by weight, 0.1% dextrose by weight, and about 0.5% sodium acid pyrophosphate by weight, the latter of which is a chelating agent and color brightener. Other ingredients also may be added to the aqueous solution as well, such as flavorings, starches, spices and/or other seasonings. Addition of starches to the aqueous solution can enhance the texture of the finished product. If a flume dip method is used, the strips would be conveyed through the solution. If the aqueous solution also is applied to the strips by spraying, the strips typically are conveyed past the sprayer. While the percentages of the various ingredients noted above are typical, the percentages that are used may be varied according to the attributes desired in the finished product, and also according to the attributes of the raw potatoes.

Following the dip in the aqueous solution containing the various processing ingredients or flavors noted, the strips are blanched in steam. This steam blanching step is preferably done for between about 1 to 3 minutes in an atmosphere of near-saturated steam, held at about 210° F. to 250° F.

The three process steps noted above (i.e., the water blanch, followed by the dip in the aqueous solution, followed by the steam blanch) are important to provide a tender, thin, crisper surface on the finished product, yet preserve the integrity of the interior. The result is a finished product having a crisp, tender texture and which has good holding characteristics. The initial low-temperature water blanch (between 150° F. to 185° F.) serves to extract natural sugars and starches from the strips while having a low-temperature precook effect on the internal tissues, thereby preconditioning the starch granules and the potato cells for the further processing steps, and in particular the steaming and drying steps.

The flume dip step in which sodium chloride, dextrose and sodium acid pyrophosphate are applied to the strips, is done prior to the steam cook to prevent the surface sugars and starches from being washed away, which would occur if the flume dip occurred after the steam cook. During the relatively short, hot steam blanch, the initial heating of the surface of the strips is completed while at the same time the surface cells on the strips are further opened up, which causes gelatinized potato starch to exude to the surface of the strips.

Following the initial steam blanch step, the strips are then partially dried in air to reduce the moisture content of the strips. This partial air drying step immediately follows the initial steam blanch so that the dried, steam-cooked surface texture of the strips is captured and maintained. Furthermore, since steam blanching can cause the strips to be fragile, air drying is carried out immediately after the initial steam blanch to reduce breakage of the strips. Drying and conditioning the strips quickly after blanching will help preserve the strip integrity. Breakage may also be reduced by using a single conveyer for these steaming and drying processing steps.

This air drying/moisture reduction step is selectively controlled so that approximately 10% to 20% of the weight of the strips is removed as moisture. Most preferably, about 12% to 18% of the weight of the strips is removed as moisture. Because the strips are blanched in steam just prior to this air drying step, the strips are still hot when the drying step begins, and moisture removal is therefore facilitated. It will be appreciated that in most instances the drying step involves conveying the strips through a tunnel dryer. In such a dryer configuration, the dryer temperatures may be between about 45° F. to 240° F, and may be varied along the length of the dryer tunnel. Preferably, the dryer temperatures will be between about 120° F. and 175° F. with the higher temperature (dry bulb) being found at the entrance of the tunnel dryer and the lower temperature being found at the exit of the dryer. This temperature gradient, optionally combined with countercurrent air flow, functions to not toughen the surface of the product. Thus, if a tunnel dryer/conveyer system is used, the dryer is preferably set up so that the temperature the strips first encounter in the dryer tunnel is higher at the inlet and decreases gradually toward the exit of the dryer. Preferably, as the strips are conveyed through the dryer, they typically would encounter a temperature of about 175° F. at the inlet of the dryer, then as the strips are conveyed through the dryer, the temperature gradually decreases through the length of the dryer so that the temperature at the exit of the dryer is about 150° F. It will be appreciated that the residence time in the dryer is controlled according to the temperature and air flow parameters so that the optimal, desired weight loss is achieved. As such, in most instances the residence time in a tunnel dryer is a function of the temperature of the dryer and air flow through the dryer.

After drying the strips with hot air, the strips are exposed to a second steam blanching treatment. In this step, the strips are exposed to steam for a brief period of between about 15 to 60 seconds, and in which the steam is at between about 210° F. to 250° F. This second steam treatment is believed to soften the surface of the partially dried potato strips, which prevents a dry, desiccated appearance after further processing, and which also facilitates equilibration of surface moisture. This second, brief steam blanch also facilitates gelatinization of any remaining surface starch on the strips before the parfrying steps. This further promotes the desirable surface texture of the finished product.

Immediately after the second short steam blanching treatment, the strips are allowed to equilibrate for about 5 minutes prior to the first parfry step. Thus, the strips are held in ambient air, preferably at about between 60° F. to 100° F. for between about 3 to 10 minutes, and preferably about 5 minutes. This step causes the moisture of the strips to equilibrate, which tends to provide a product having a more consistent color and texture.

The strips are then parfried in oil a first time. In this first parfrying step, the processing parameters are controlled to produce a strip having approximately about 35% to 40% solids after parfrying, with a preferred solids content of between about 36% to 37% solids. With this optimal parameter in mind, the strips are typically parfried in oil at between 325° F. to 380° F. for between about 35 to 150 seconds.

After parfrying, the strips are cooled in air at between about 35° F. to 65° F for a minimum of about 15 to 20 minutes. The optimal time for this cooling step is between about 30 to 45 minutes, although longer cooling periods have been utilized without detrimental impact on the finished product. The strips are not frozen in this step. This cooling step contributes to the improved texture of the finished product, and is believed to make the product more pliable and less likely to break during further processing. It also causes the product to retain an improved internal and surface texture during further processing and subsequent final preparation. This air cooling step can be accomplished in a refrigerated cooling tunnel in which air flow is used to facilitate the cooling and retrograde process. Typically, the strips are conveyed through the cooling tunnel on a conveyer belt. It is important to maintain a shallow bed depth of product on the conveyer belt while the strips are conveyed through the cooling tunnel in this product conditioning step, and also to maintain sufficient air flow through the tunnel to rapidly remove heat from the product, reduce product temperature uniformly in all product on the conveyer belt, remove surface moisture, and to prevent the clustering or clumping of the chilled strips. Excessive bed depths, for instance, bed depths of greater than about 3 inches, can cause clustering of the strips of fries, and impede uniform cooling and moisture migration within and from the strips. It is also important to control the temperature within the cooling tunnel to prevent the strips from being frozen.

After the just described long-cooling step, the strips are processed through a second parfrying treatment for a longer time period than the first parfry, but typically at a lower temperature. The preferred parameters for this second parfrying step are parfrying in oil at between about 325° F. to 380° F., preferably about 345° F., for between about 35 to 120 seconds, and preferably about 90 seconds. The time of the second parfry will depend upon several factors, such as the thickness of the raw strip. It will be appreciated that the time and the temperature parameters may need to be adjusted for various sizes and shapes of potatoes. In any event, the product after the second parfry step preferably has a solids content between about 44% to 55% solids.

After the second parfry step, the strips are cooled and frozen in conventional manners. Thus, the strips are typically pre-cooled in ambient air followed by chilled air for about 5 to 10 minutes, and subsequently frozen by holding the strips in cooled air at between about −30° F. to 0° F. for 10 to 30 minutes, for instance in freezers of any number of designs.

The frozen product may then be packaged, stored and shipped in a conventional manner.

The resulting frozen product may be reconstituted by finish frying, or oven rethermalization in either conventional ovens, convection ovens, high velocity air impingement ovens, or microwave ovens. When reconstituted by deep fat frying (i.e., finish frying), the frozen product produced according to the steps detailed above may be prepared in a shorter time period than frozen french fries produced by more traditional processing methods. Thus, the finish frying time for frozen french fries prepared according to the present invention varies according to the size and type of cut being prepared. For conventional french fries having a cross sectional diameter of between about 0.25 to 0.375 inches, a typically finish frying time for french fries prepared according to this invention is about 90 to 110 seconds. On the other hand, frozen french fries prepared according to traditional processes typically require a finish frying time of between about 150 to 180 seconds.

The finished product produced according to this invention also has improved organoleptic qualities and physical qualities. The french fries have a thin, crisp shell with a tender texture which will retain crispness under a heat lamp for extended periods. The french fries have a strong potato flavor. The texture and flavor of the product remain desirable even through extended holding periods.

The product prepared according to the method described above is also amenable to oven reconstitution, and when reconstituted in this manner results in a desirable product having excellent flavor, appearance and holding qualities. Oven preparation time in a convection oven is typically 4 to 6 minutes, versus 10 to 15 minutes for french fries prepared according to more conventional processes reconstituted in a convection oven. Furthermore, the oven-reconstituted product has a quality similar to product reconstituted by deep frying, yet has less fat content when baked.

The processing steps may also be used to produce a french fried strip amenable to reconstitution by microwave heating. Microwave reconstitution typically produces the best results when the product is parfried to a higher solids content of about 50% or higher, and is preferably used with larger cut sizes, such as a ⅜ inch to ½ inch regular cut or crinkle cut french fry strip. The higher solids content may be regulated in the second parfrying step described above. As to products that are to be reconstituted in a microwave oven, rethermalization in a microwave susceptor package produces a product with excellent qualities and flavor attributes, and which has a lower content of fat than product that is reconstituted by finish frying.

The present invention is illustrated by the following examples.

EXAMPLE NO. 1

Russet-Burbank potatoes were cleaned then peeled in steam at 200 pounds per square inch for approximately 14 seconds. The peeled potatoes were then preheated in water held at between 130° F. to 135° F. for 35 minutes, then cut into strips having a cross-sectional dimension of approximately 0.312 inches by 0.312 inches. The strips were then blanched for 9 minutes in hot water held at 160° F. The strips were then dipped for 30 second in a heated aqueous solution containing 0.5% by weight sodium acid pyrophosphate, 0.1 % by weight dextrose, and 2.2% by weight sodium chloride. This aqueous solution was heated to about 160° F. Following immersion in the hot solution, the strips were blanched for 1 minute in steam at 212° F.

The strips were then dried in 175° F. air for 5½ minutes to effect a weight loss of 17.2%. Steam was then applied to the strips at 211° F. for 16 seconds. After application of steam, the strips were held for five minutes in ambient air (between about 65° F. to 85° F. ), then fried a first time for 60 seconds in oil at 355° F. After this first parfrying step there was a weight loss of 25%. The strips were then cooled for 30 minutes in 45° F. air, effecting a further weight loss of 7%. The strips were then parfried a second time for 90 seconds in oil at 345° F., resulting in a further weight loss of 16.9%. The strips were then frozen.

Analysis of the frozen strips showed that the strips had 48.82% plus or minus 0.15% solids, 11.75% plus or minus 0.12% oils, and 0.6% salt.

EXAMPLE NO. 2

In this example the peel was left on the potato.

Whole, unpeeled Russet-Burbank potatoes were cleaned then preheated in hot water at between about 130° F. to 135° F. for 35 minutes, then cut into strips having cross-sectional dimensions of 0.375 inches by 0.375 inches. The strips were then immersion blanched for 6 minutes in hot water held at 160° F., then dipped in an aqueous solution for 30 seconds. The solution was held at 160° F., and contained 0.5% by weight sodium acid pyrophosphate, 0.1 % by weight dextrose, and 2.2% by weight sodium chloride. The strips were then steam blanched for 1 minute at 212° F.

The strips were then dried in air at 175° F. for 5½ minutes to effect a weight loss of 16.1%. Steam was applied to the strips at 211° F. for 16 seconds. The strips were then allowed to equilibrate in ambient air at between 65° F. to 85° F.

The strips were then parfried a first time for 60 seconds in oil at 355° F., effecting a weight loss of 15.23%. The strips were then cooled for 30 minutes at 45° F., effecting a further weight loss of 2.31 %. The strips were then parfried a second time in oil at 345° F. for 90 seconds, further effecting a weight loss of 13.78%. The strips were then frozen.

The frozen strips had 44.62% plus or minus 0.12% solids, 9.29% plus or minus 0.16% oils and 0.3% sodium chloride.

EXAMPLE 3

In this example the potatoes were cut into a ½ inch concertina cut, and there was no sodium chloride added to the strips in the process.

Whole potatoes were cleaned then peeled in steam at 200 pounds per square inch for 14 seconds, then preheated in hot water at between about 130° F. to 135° F. for 35 minutes. The strips were then cut into a ½ inch concertina cut and immersion blanched for 6 minutes in water held at 160° F. The strips were then dipped in an aqueous solution containing 0.5% by weight sodium acid pyrophosphate and 0.1% by weight dextrose for 30 seconds. The solution was held at 160° F. The strips were then steam blanched at 212° F. for 1 minute.

Next, the strips were dried at 175° F. for 5½ minutes, effecting a weight loss of 16.5%. The strips were then exposed to steam at 211° F. for 16 seconds, then allowed to equilibrate in ambient air at between 65° F. to 85° F. for 5 minutes.

The strips were then parfried in hot oil at 355° F. for 60 seconds, effecting a weight loss of 20.17%. The strips were then cooled for 30 minutes at 45° F., resulting in a further weight loss of 1.3%. The strips were then parfried the second time in hot oil at 345° F. for 90 seconds, resulting in a further weight loss of 17.43%. The strips were then frozen.

The frozen strips had 45.49% plus or minus 0.12% solids, 10.35 plus or minus 0.11 % oil, and no detected sodium chloride.

EXAMPLE 4

The general parameters in this example apply to any cut of potato.

Whole potatoes were cleaned then peeled and steamed at 200 pounds per square inch for 14 seconds, then preheated in hot water at between 130° F. to 135° F. for 35 minutes. The whole potato is then cut to any desired raw cut, for instance strips. The strips are then immersion blanched for 6 minutes in water held at 160° F., then dipped in an aqueous solution containing, among other optional ingredients such as starches and flavors, 0.5% by weight sodium acid pyrophosphate, 0.1% by weight dextrose, and 2.2% by weight sodium chloride. The aqueous solution is held at 160° F., and the strips are held in the solution for 30 seconds. The strips are then steam blanched at 212° F. for 1 minute.

The strips are then dried in air at 175° F. for a time sufficient to effect a weight loss of 16% to 18%. Steam is then applied to the strips at 211° F. for about 16 seconds. After the steam application the strips are allowed to equilibrate in ambient air (between 65° F. and 85° F.), for about 5 minutes.

The strips are then parfried in hot oil at 355° F. for 60 seconds, cooled in air for 30 minutes at 45° F., then parfried a second time in hot oil at 345° F. for 90 seconds. The strips are then frozen.

Strips produced according to this example will have solids, oils and sodium chloride content consistent with the results reached in examples 1, 2 and 3 above.

In all of the above examples, the strips on reconstitution, whether by finish frying or oven-reconstitution demonstrated excellent flavor, texture and superior holding qualities.

Having illustrated and described the principles involved in this invention, it should be apparent to those persons skilled in the art that such embodiments as described may be modified in arrangement and detail without departing from the principles described. We claim as our invention all such modifications as come within the true spirit and scope of the invention as defined by the following claims.

We claim:

1. A method of preparing frozen parfried potato strips ready for reconstitution comprising the steps of:

cutting the potatoes into strips;

blanching the strips a first time by immersing the strips in hot water at a temperature of about 150° F. to 180° F. for about 4 to 20 minutes;

blanching the strips a second time in steam for about 1 to 3 minutes at a temperature of about 210° to 250° F.

partially drying the twice blanched strips in air to remove moisture therefrom sufficient to reduce the weight of the strips by about 10 to 20% by weight;

exposing the partially dried strips to steam for about 15 to 60 seconds at a temperature of about 210° to 250° F. to soften the surface of the partially dried strips;

thereafter eguilibrating the strips in air at a temperature of about 60 ° to 100° F. for about 5 minutes;

parfrying the equilibrated strips a first time in oil;

cooling the parfried strips in air at a temperature of about 35° F. to 65° F. for about 30 to 60 minutes;

parfrying the cooled strips a second time in oil; and thereafter freezing the strips.

2. The method according to claim 1 wherein the cooling step includes the step of conveying the strips through a cooled zone on a conveyer belt, and wherein the strips are oriented on the belt in a manner to facilitate uniform heat removal from the strips, and wherein the temperature of the cooled zone is controlled to prevent freezing the strips.

3. The method according to claim 2 wherein the bed depth of the strips on the conveyer is no more than about 3 inches.

4. The method according to claim 1 including the step of peeling the potatoes.

5. The method according to claim 4 wherein the potatoes are peeled before they are cut.

6. The method according to claim 1 including the step of dipping the strips in a heated aqueous solution comprising about 2.2% by weight sodium chloride, 0.5% by weight sodium acid pyrophosphate and about 0.1 % by weight dextrose.

7. The method according to claim 6 wherein the strips are dipped in the heated solution between the initial blanch in hot water and the second blanch in steam.

8. A method for preparing frozen parfried potato strips ready for reconstitution comprising the steps of:

(a) peeling whole potatoes;

(b) cutting the whole potatoes into strips;

(c) blanching the strips a first time by immersing the strips in water at a temperature of about 150° F. to 180° F. for about 4 to 20 minutes;

(d) blanching the strips a second time by exposing the strips to steam for about 1 to 3 minutes at a temperature of about 210° F. to 250° F.;

(e) partially dehydrating the twice blanched strips to reduce the weight of the strips by about 10–20%;

(f) exposing the partially dehydrated strips to steam for about 15 to 60 seconds at a temperature of about 210° to 250° F. to soften the surface of the partially dehydrated strips; thereafter (g) parfrying the strips a first time in oil;

(h) cooling the parfried strips without freezing them by transferring the strips to a conveyor belt on which the strips are in a layer no thicker than about 3 inches, and conveying the strips through a cooling tunnel in which the air temperture is about 35 ° to 65° F. for a time period of about 30 to 60 seconds;

(i) parfrying the cooled strips a second time in oil; and thereafter (j) freezing the strips.

9. The method according to claim 8 including the step between steps (c) and (d) of dipping the strips in an aqueous solution heated to about 160° F. and comprising about 2.2% by weight sodium chloride, 0.5% by weight sodium acid pyrophosphate and 0.1% by weight dextrose.

10. A method for making frozen parfried potato strips for subsequent reconstitution prior to consumption, comprising the steps of:

(a) blanching potato strips a first time in hot water;

(b) blanching the strips a second time in steam;

(c) partially dehydrating the twice blanched strips;

(d) exposing the partially dehydrated strips to steam to soften the surface of the partially dehydrated strips; thereafter (e) parfrying the strips a first time in oil;

(f) cooling the parfried strips without freezing them by holding the strips in air cooled to about 35° F. o 65° F. for about 30 to 60 minutes;

(g) parfrying the cooled strips a second time in oil; and thereafter (h) freezing the strips.

11. The method of claim 10 wherein the second blanching step is preceded by dipping the strips in an aqueous solution comprising sodium chloride, sodium acid pyrophosphate and dextrose.

12. The method of claim 10 wherein the cooling step is carried out at about 45° F.

* * * * *

UNITED STATES PATENT AND TRADEMARK OFFICE
CERTIFICATE OF CORRECTION

PATENT NO. : 5,753,291

DATED : May 19, 1998

INVENTOR(S) : Paul Pederson, David Braich, Roger Samoray, Jerry L. Sloan

It is certified that error appears in the above-indentified patent and that said Letters Patent is hereby corrected as shown below:

On the title page, item [56], Foregin Patent Documents should be added:

| Number | Date | Country |
|---|---|---|
| WO 97/40703 | 11/06/97 | PCT International |
| WO 97/40707 | 11/06/97 | PCT International |
| WO 97/40708 | 11/06/97 | PCT International |
| WO 97/40709 | 11/06/97 | PCT International |
| WO 97/40710 | 11/06/97 | PCT International |
| WO 97/40711 | 11/06/97 | PCT International |

Column 10, line 4, "eguilibrating" should be --equilibrating--.
Column 10, line 56, "seconds" should be --minutes--.
Column 11, line 8, "o" should be --to--.

Signed and Sealed this

Twenty-sixth Day of October, 1999

Attest:

Q. TODD DICKINSON

Attesting Officer

Acting Commissioner of Patents and Trademarks